United States Patent
Feng et al.

(10) Patent No.: US 9,151,416 B2
(45) Date of Patent: Oct. 6, 2015

(54) FIBER REINFORCED SHAPED ARTICLES AND PROCESS FOR MAKING SAME

(75) Inventors: Ke Feng, Cincinnati, OH (US); Jeroen Visjager, Cleves, OH (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 13/996,701

(22) PCT Filed: Dec. 22, 2011

(86) PCT No.: PCT/US2011/066724
§ 371 (c)(1), (2), (4) Date: Jul. 26, 2013

(87) PCT Pub. No.: WO2012/088375
PCT Pub. Date: Jun. 28, 2012

(65) Prior Publication Data
US 2013/0323447 A1 Dec. 5, 2013

Related U.S. Application Data (60) Provisional application No. 61/426,409, filed on Dec. 22, 2010, provisional application No. 61/446,783, filed on Feb. 25, 2011.

(51) Int. Cl.
*B32B 1/02* (2006.01)
*F16L 9/12* (2006.01)
(Continued)

(52) U.S. Cl.
CPC .............. *F16L 9/12* (2013.01); *B29C 49/0005* (2013.01); *B29C 49/04* (2013.01);
(Continued)

(58) Field of Classification Search
CPC .................................... B32B 1/02; B32B 1/08
USPC ............ 428/34.1, 34.2, 35.7, 35.9, 36.4, 36.9
See application file for complete search history.

(56) References Cited

U.S. PATENT DOCUMENTS

| | | |
|---|---|---|
| 4,083,829 A | 4/1978 | Calundann et al. |
| 4,161,470 A | 7/1979 | Calundann |

(Continued)

FOREIGN PATENT DOCUMENTS

| | | |
|---|---|---|
| EP | 0 345 094 A1 | 12/1989 |
| EP | 0 358 135 B1 | 3/1990 |

(Continued)

OTHER PUBLICATIONS

Abstract of Japanese Patent—JPH11228829, Aug. 24, 1999, 1 page.
(Continued)

*Primary Examiner* — Marc Patterson
(74) *Attorney, Agent, or Firm* — Dority & Manning, P.A.

(57) ABSTRACT

Blow molded articles are made from a polymeric composition containing a mixture of polyphenylene sulfide resins. For instance, the polymeric composition may contain a linear polyphenylene sulfide resin combined with a branched polyphenylene sulfide resin. The composition can further contain a reinforcing agent, such as glass fibers, a polytetrafluoroethylene polymer, a polyphenylene oxide polymer, a silane coupling agent, and/or an impact modifier. Compositions made according to the present disclosure can have relatively high near zero shear rate melt strengths while also having high shear rate melt viscosities and high engineering stresses at a high percent elongations, making the compositions amenable to extrusion and molding processes. Compositions made according to the present disclosure are particularly well suited to molding articles with a complex shape. When producing blow molded articles, for instance, the composition provides better control over wall thickness while having improved interior surface smoothness at higher throughput and extrusion rates.

17 Claims, 7 Drawing Sheets

(51) Int. Cl.
  *B29C 49/00* (2006.01)
  *C08L 81/02* (2006.01)
  *F02M 35/10* (2006.01)
  *B29C 49/04* (2006.01)
  *B29C 49/42* (2006.01)
  *C08L 81/04* (2006.01)
  *B32B 1/08* (2006.01)
  *B29L 23/00* (2006.01)

(52) U.S. Cl.
  CPC ............ *B29C 49/4242* (2013.01); *C08L 81/02* (2013.01); *C08L 81/04* (2013.01); *F02M 35/10131* (2013.01); *F02M 35/10321* (2013.01); *B29L 2023/004* (2013.01); *C08L 2205/02* (2013.01); *Y10T 428/1372* (2015.01)

(56) References Cited

U.S. PATENT DOCUMENTS

| | | |
|---|---|---|
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,522,974 A | 6/1985 | Calundann et al. |
| 4,596,839 A | 6/1986 | Peters |
| 4,769,424 A | 9/1988 | Takekoshi et al. |
| 4,814,430 A | 3/1989 | Iwasaki et al. |
| 4,889,893 A | 12/1989 | Kobayashi et al. |
| 4,910,082 A | 3/1990 | Kohn |
| 4,956,499 A * | 9/1990 | Fukuda et al. ............... 524/500 |
| 5,122,578 A | 6/1992 | Han et al. |
| 5,132,373 A | 7/1992 | Khouri et al. |
| 5,149,731 A | 9/1992 | Uota et al. |
| 5,204,443 A | 4/1993 | Lee et al. |
| 5,212,255 A | 5/1993 | Khouri et al. |
| 5,380,783 A | 1/1995 | Satake et al. |
| 5,464,635 A | 11/1995 | Geiger |
| 5,541,240 A | 7/1996 | Makhija et al. |
| 5,625,002 A | 4/1997 | Kadoi et al. |
| 5,840,830 A | 11/1998 | Miyahara et al. |
| 6,289,863 B1 | 9/2001 | Hada et al. |
| 6,371,070 B2 | 4/2002 | Munetoki et al. |
| 6,417,293 B1 | 7/2002 | Chorvath et al. |
| 6,645,623 B2 | 11/2003 | Dean et al. |
| 7,271,212 B2 | 9/2007 | Oguni et al. |
| 7,303,822 B1 | 12/2007 | Matsuoka et al. |
| 7,385,013 B2 | 6/2008 | Kobayashi et al. |
| 7,485,682 B2 | 2/2009 | Ajbani et al. |
| 7,569,635 B2 | 8/2009 | Kojima et al. |
| 7,591,505 B2 | 9/2009 | Onizawa et al. |
| 8,017,053 B2 | 9/2011 | De Rijcke et al. |
| 8,221,862 B2 | 7/2012 | Saitoh et al. |
| 2008/0004375 A1 | 1/2008 | Kondo et al. |
| 2013/0263959 A1 | 10/2013 | Nezu et al. |

FOREIGN PATENT DOCUMENTS

| | | |
|---|---|---|
| EP | 0 492 129 A1 | 7/1992 |
| EP | 0 635 548 A1 | 1/1995 |
| EP | 1 630 201 A1 | 3/2006 |
| EP | 1 849 834 A1 | 10/2007 |
| EP | 2 239 135 A1 | 10/2010 |
| EP | 2 402 397 A2 | 1/2012 |
| EP | 2 402 397 A3 | 1/2012 |
| GB | 2 258 286 A | 2/1993 |
| WO | WO 2005/019341 A1 | 3/2005 |
| WO | WO 2009/122292 A2 | 10/2009 |
| WO | WO 2009/122292 A3 | 10/2009 |

OTHER PUBLICATIONS

LOTADER AX 8840 data sheet, Arkema, Jul. 2005, 2 pages.
LOTADER AX 8840 data sheet, Arkema, Jul. 2004, 2 pages.
Product Information—Silane coupling agents, Shin-Etsu Silicones, http://www.silicone.jp/e/products/type/silanecup/index.shtml, at least as early as May 27, 2010, 2 pages.
Paper—The ARES/EVF: Option for Measuring Extensional Viscosity of Polymer Melts, A. Franck, TA Instruments Germany, PN002 V2, May 1, 2011, 6 pages.
Search Report and Written Opinion for PCT/US2011/066724 dated Oct. 4, 2012, 12 pages.
International Preliminary Report on Patentability dated Jul. 4, 2013, 8 pages.
Platt, David K., Engineering and High Performance Plastics Market Report: A Rapra Market Report, Shrewsbury: Rapra Technology, 2003, p. 23 ISBN 1-85957-380-0.

* cited by examiner

FIBER REINFORCED SHAPED ARTICLES AND PROCESS FOR MAKING SAME

RELATED APPLICATIONS

The present application claims priority to and is based upon Provisional Application Ser. No. 61/446,783, filed Feb. 25, 2011, the entire contents of which are incorporated herein by reference thereto, which claims priority to and is based upon Provisional Application Ser. No. 61/426,409, filed Dec. 22, 2010, the entire contents of which are incorporated herein by reference thereto.

BACKGROUND

Various different high temperature engineering plastics exist that can be used to form different parts and articles. Such polymers include, for instance, polyarylene sulfide polymers. Polyarylene sulfide polymers are strong, have excellent chemical resistance, have high rigidity, and have good resistance to heat such that they can be used in high temperature applications. For example, polyarylene sulfide polymers can be used to replace metal parts at a fraction of the weight. In addition to being lighter, articles made from polyarylene sulfide polymers also produce less noise and are more resistant to chemical attack than many metals.

Polyarylene sulfide polymers are also thermoplastic in nature, allowing them to be used in various molding processes, such as injection molding.

For instance, in the past, various molded parts have been produced from a composition containing a polyarylene sulfide polymer combined with glass fibers and an aminosilane. The above composition has proved very successful in producing various products, particularly made via injection molding. The above composition, however, also does have its limitations when used in particular molding processes, such as extrusion blow molding.

For example, when blow molding with fiber reinforced polyarylene sulfide resins, problems have been experienced in controlling and/or obtaining uniform wall thickness during forming of the parison. For instance, during complex blow molding operations, tubular members are formed that are constantly in a downward direction while the polymeric composition remains at an elevated temperature. The polymeric composition is extruded through an annular opening or die until a desired length of the parison is obtained. The parison needs to maintain uniform wall thickness while it is being extruded and resist stretching or elongation under only its own weight until a desired length is obtained to begin blow molding. The parison may also be maneuvered for example by a robot during extrusion to change the angular displacement of the tubular form to a specific shape.

The mold closes onto the tubular form once the desired length is attained and a needle is inserted at one end of the closed parison to allow a gas or air to be injected into the tubular form to blow mold the article into its final shape. During the above process, past compositions containing a polyarylene sulfide resin had a tendency to sag during the process causing changes to the thickness of the parison inadvertently. Sagging is a low shear phenomenon and is affected by the melt strength or melt elasticity of the polymeric composition.

In this regard, the present disclosure is directed to fiber reinforced polymeric compositions containing polyarylene sulfide polymers that are capable of forming molded parts having a complex shape. More particularly, the present disclosure is directed to a fiber reinforced polyarylene sulfide composition that is more amenable for use in extrusion and blow molding processes for producing parts with complex shapes.

SUMMARY

In general, the present disclosure is directed to a fiber reinforced polyarylene sulfide composition that is well suited for use in molding processes, particularly blow molding processes for producing parts having a relatively complex shape. In particular, fiber reinforced polymeric compositions made according to the present disclosure, when heated and extruded, have the improved ability to hold its shape even at temperatures close to the melt temperature of the thermoplastic material. As will be described in greater detail below, the composition formulated in accordance with the present disclosure has unexpectedly high melt strength at near zero shear rates, and can exhibit high engineering stress at high percent elongations. Thus, the composition is well suited for complex molding operations in which a parison is initially formed and then manipulated over a period of time to form a shaped article.

In one embodiment, for instance, the present disclosure is directed to a shaped polymer article comprising a blow molded hollow member having an interior surface and an exterior surface. The hollow member is made from a fiber reinforced polymeric composition comprising a blend of polyarylene sulfide resins. One polyarylene sulfide resin, for instance, may comprise a linear polyphenylene sulfide resin having a melt viscosity of from about 20 Pa·s to about 500 Pa·s at 310° C. and at 1200 s$^{-1}$. Melt viscosity is determined herein using a capillary rheometer. The linear polyphenylene sulfide resin is combined in the composition with a branched polyphenylene sulfide resin, and particularly a high molecular weight branched polyphenylene sulfide resin. The ratio of the branched polyphenylene sulfide resin to the linear polyphenylene sulfide resin can be from about 1:5 to about 1:60.

The branched polyphenylene sulfide polymer, for instance, may have been polymerized with a dihalo-aromatic compound and a polyhalo-aromatic compound. The molar ratio of dihalo-aromatic compound to the polyhalo-aromatic compound may be from about 99.7:0.3 to about 92:8, such as from about 99:1 to about 95:5. Combining a linear polyphenylene sulfide resin with a branched polyphenylene sulfide resin can dramatically increase the low shear rate storage modulus during processing.

The composition further contains reinforcing fibers present in an amount from about 10% to about 50% by weight. The reinforcing fibers may comprise, for instance, glass fibers. The composition can further contain a compatibilizer.

The compatibilizer may comprise any suitable compound capable of strengthening the interface between the polyphenylene sulfide resins and other components of the composition. In one embodiment, for instance, the compatibilizer may comprise an organosilane coupling agent. The organosilane coupling agent may be present in the composition in an amount from about 0.1% to about 5% by weight.

The polymeric composition may also contain a polytetrafluoroethylene polymer. The polytetrafluoroethylene polymer may be present in an amount from about 0.01% to about 5% by weight. The polytetrafluoroethylene polymer comprises a viscosity stabilizing agent. The polytetrafluoroethylene polymer, for instance, can prevent non-uniformities in the viscoelastic properties of the polymer and thus prevent or inhibit low viscosity domains from forming in the polymeric composition. The polytetrafluoroethylene polymer can also be used to increase melt strength and melt elongation.

In yet another embodiment of the present disclosure, a reactive impact modifier may be added to the composition that is reactive with the compatibilizer, such as the organosilane coupling agent, and/or with one of the polyarylene sulfide resins. The reactive impact modifier can be present in the composition in an amount from about 0.5% to about 10% by weight. The reactive impact modifier can increase the low shear viscosity and melt strength of the composition.

The composition can also contain a polyphenylene oxide polymer. The polyphenylene oxide polymer has been found to increase the thermal stability of the composition. In one embodiment, the polyphenylene oxide can be present in an amount from about 3% to about 30% by weight.

The above components may be blended together to form the composition such that the composition has relatively high melt strength but also high engineering stresses at various percent strains. For example, the formulated polymeric composition may have a melt viscosity of greater than about 3500 poise, such as from about 4000-poise to about 12,500 poise when measured at 316° C. and at 400 s$^{-1}$. The composition may also be formulated to have a relatively high low shear rate storage modulus. For instance, the shear rate storage modulus may be generally greater than about 1500 Pa, such as from about 1600 Pa to about 6000 Pa, when measured at 310° C. and at 0.1 rad/s.

In addition, the formulated polymeric composition may exhibit various engineering stresses at various percent strains on a stress strain curve at 300° C., 5 s$^{-1}$. For instance, the composition can have a maximum engineering stress of from about 450 kPa to about 650 kPa, which can occur at percent strain of from about 60% to about 90%. Further, the composition can, have an engineering stress of from about 350 kPa to about 550 kPa at a percent strain of about 100%. Moreover, the composition can have a yield point on its stress-strain curve that occurs at an engineering stress of from about 100 kPa to about 450 kPa and at a corresponding percent strain of from about 5% to about 25%. Further, strain hardening over a range of stresses increasing from about 100 kPa to about 650 kPa can occur at percent strains ranging from about 5% to about 90%. Additionally, necking over a range of stresses decreasing from about 700 kPa to about 100 kPa can occur at percent strains ranging from about 60% to about 150%.

In one embodiment of the present disclosure, the polyphenylene sulfide resins are present in an amount of at least 35% by weight, such as from about 50% to about 90% by weight. In one embodiment, the linear polyphenylene sulfide resin may be present in the composition in an amount from about 55% to about 85% by weight, while the branched polyphenylene sulfide resin may be present in the composition in an amount from about 0.5% by weight to about 20% by weight.

In one embodiment, the impact modifier used in accordance with the present disclosure comprises a random copolymer of a polyolefin and glycidyl methacrylate. The impact modifier may be present in an amount from about 0.5% to about 10% by weight. The impact modifier may also comprise a random copolymer of polyethylene and glycidyl methacrylate wherein the glycidyl methacrylate is present in the copolymer in an amount from about 6% to about 10% by weight. The impact modifier may have a functionality that is reactive to both the polyphenylene sulfide polymers and the organofunctional silane compatibilizer. The functionality can include epoxy, anhydride, acid, oxalazone, amine, glycidyl methacrylate and may be in the range of 0.5% to 20% by weight.

As described above, the compatibilizer may comprise a silane coupling agent. In one embodiment, for instance, the coupling agent may comprise 3-aminopropyltrimethoxysilane and/or 3-aminopropyltriethoxysilane.

The present disclosure is also directed to a process for producing a shaped polymer article. The process includes the steps of heating and extruding a fiber reinforced polymeric composition as described above. The composition is extruded in a downward direction to form a hollow parison.

In one particular embodiment, the top of the parison is clamped and then robotically manipulated into a three-dimensional mold cavity. The parison is inflated with sufficient pressure for the parison to conform to the mold cavity after the mold cavity has closed. After blow molding, the shaped polymer article is then removed from the mold cavity and used as desired.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a fiber reinforced polymeric composition particularly well suited for producing molded parts having a complex shape. In the past, for instance, when blow molding reinforced polyarylene sulfide resins, problems were experienced during forming of the parison and during molding due to insufficient strength when the resins were elongated during part of the process. While polyarylene sulfide compounds, such as polyphenylene sulfide, could be formulated with either high strength or percent strain, there was not a formulation that could exhibit a high strength at a high percent strain. Compositions made in accordance with the present disclosure, however, contain a blend of polyphenylene sulfide resins in controlled amounts and in controlled proportions such that the composition has a relatively strength at a high percent strain, as well as a relatively high melt viscosity and high low shear rate storage modulus. Such compositions thus have great melt elongation and melt strength properties at near zero shear rates. Consequently, compositions made according to the present disclosure are well suited to holding their shape, even at temperatures close to the melt temperature.

More specifically, polymeric compositions according to the present disclosure contain a linear polyphenylene sulfide resin combined with a branched polyphenylene sulfide resin. The polymeric compositions may also contain a compatibilizer and reinforcing fibers.

Optionally, the composition may also contain a viscosity stabilizer which, in one embodiment, comprises a polytetrafluoroethylene polymer. As will be described in greater detail below, various other components may also be present in the composition, such as an impact modifier, which all serve to improve one or more properties of either the composition during molding and/or of the resulting shaped articles made from the compositions.

In one embodiment, the polymeric composition of the present disclosure can be fiber reinforced and can have a melt viscosity of greater than 3500 poise when measured at 316° C. and at 400 s$^{-1}$. For instance, the melt viscosity of the composition can be greater than about 5000 poise, such as greater than about 7500 poise, such as even greater than about 10,000 poise when measured at 316° C. and 400 s$^{-1}$ (capillary rheometer). For most applications, the melt viscosity is generally less than about 12,500 poise when measured at 316° C. and at 400 s$^{-1}$.

The composition can also have a relatively high low shear rate storage modulus. The low shear rate storage modulus of the composition, for instance, can generally be greater than about 1500 Pa when measured at 310° C. and at 0.1 rad/s. For example, the low shear rate storage modulus can generally be greater than 1600 Pa, such as greater than 1700 Pa, such as greater than 1800 Pa, such as even greater than 1900 Pa, such as even greater than 2000 Pa when measured at 310° C. and at 0.1 rad/s. The low shear rate storage modulus is generally less than about 6000 Pa, such as less than about 4000 Pa when measured at 310° C. and 0.1 rad/s.

Figure 7:
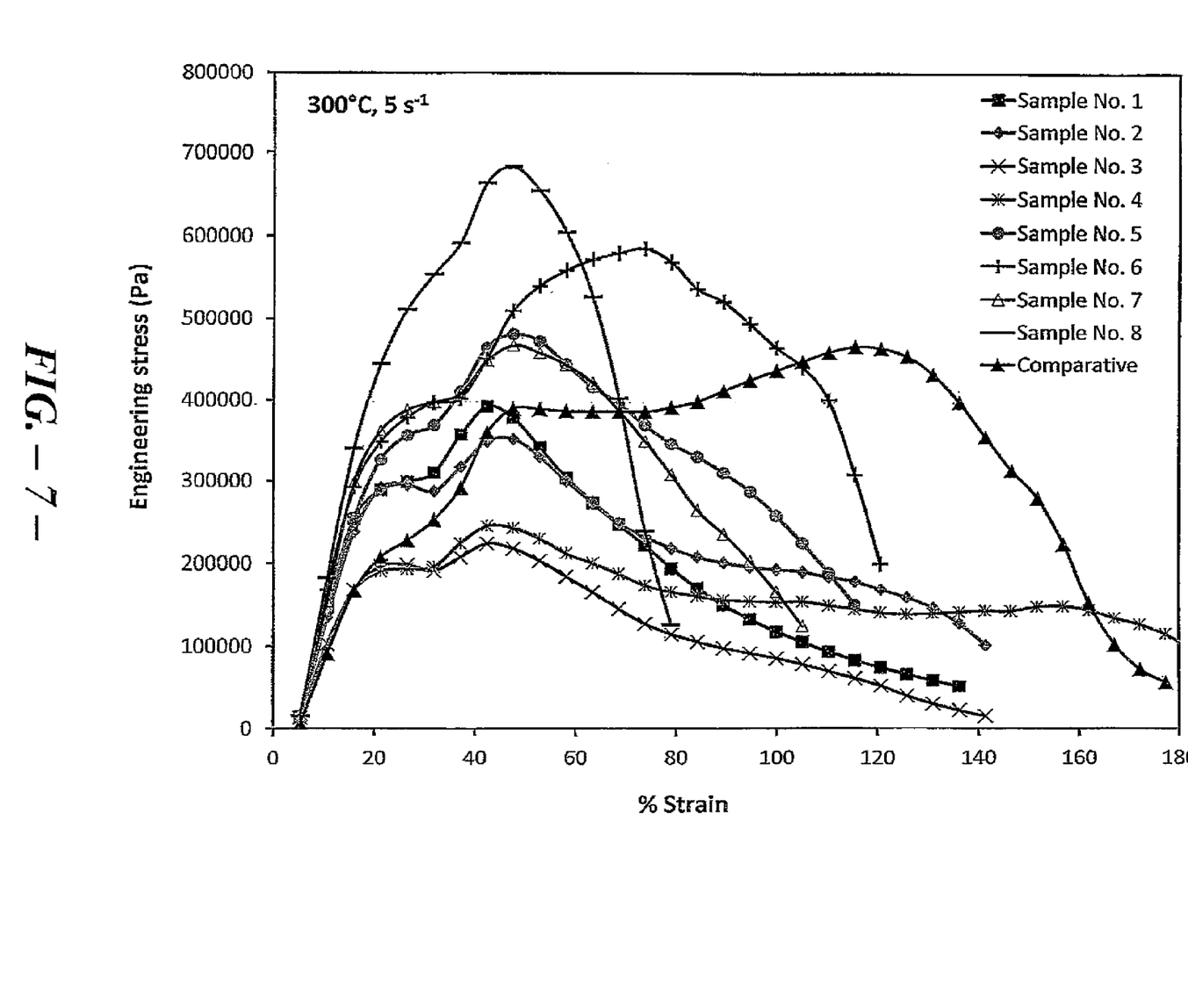
FIG. 7 is a graph showing the stress-strain curve for various polymeric compositions described in the present disclosure.

The composition can also exhibit certain traits on a stress-strain curve at 300° C., 5 s$^{-1}$, as shown in detail in FIG. 7. The stress-strain curve is determined through uniaxial tensile testing of a specimen and shows the engineering stress (Pa) on the y-axis plotted against the percent strain (%) on the x-axis. The test specimens used in obtaining the data for FIG. 7 were approximately 10 mm wide by 30 mm long and had a thickness of about 0.8 mm. Test specimens can be obtained by compression or injection molding and can then be tested on an instrument such as a TA ARES with EVF (extensional viscosity fixture) at preset temperature and elongation rates to determine each specimen's stress-strain curve.

The stress-strain curve graphically represents the relationship between the stress, which is derived from measuring the load applied on the sample, and the strain, which is derived from measuring the deformation of a sample, i.e. elongation, compression, or distortion. The test process involves placing a specimen of any of the compositions described herein in a mechanical testing apparatus and subjecting the sample to tension until the sample fractures. During the application of tension, the sample's elongation is recorded against the applied force. The data is manipulated so that it is not specific to the geometry of the test sample, and a resulting stress-strain curve can be plotted.

The elongation measurement is used to calculate the strain, $\epsilon$, using the following equation, which can be converted to percent strain by multiplying by 100:

$$\varepsilon = \frac{\Delta L}{L_0} = \frac{L - L_0}{L_0}$$

where $\Delta L$ is the change in gauge length, $L_0$ is the initial gauge length, and L is the final length. The force measurement is used to calculate the engineering stress, $\sigma$, using the following equation:

$$\sigma = \frac{F_n}{A}$$

where F is the force and A is the cross-sectional area of the sample or specimen. The tensile testing machine calculates the stress and strain as the force increases, so that the data points can be graphed into a stress-strain curve. For thermoplastic polymeric materials such as polyarylene sulfide polymer blends, the stress-strain curve typically includes an initial linear region that represents the elastic portion of the curve and a non-linear region that represents the plastic region of the curve. In the linear portion of the stress-strain curve, the stress is proportional to the strain. The elastic portion is the portion of the curve where the material will return to its original shape if the load is removed, while the plastic portion is the portion where some permanent deformation will occur, even if the load is removed. The point at which the linear (elastic) region of the curve ends and the non-linear (plastic deformation) region of the curve begins is known as the yield point. After the linear to non-linear transition point (the yield point or yield stress), the material undergoes yielding, where a slight increase in stress above the elastic limit will result in a breakdown of the material and cause it to deform permanently. The deformation that occurs here is called plastic deformation, and unlike with elastic loading, a load that causes yielding of the material will permanently change the material properties. During yielding, the material specimen will continue to elongate, as shown by an increase in the percent strain without any increase in stress, which is shown in FIG. 7 where the sample curves are flat immediately after the yield point. At this point, the material is referred to as perfectly plastic. For the samples in FIG. 7, the yielding behavior is minimal.

After yielding, the stress again increases with an increase in elongation, where when a further load is applied to the specimen, the resulting curve rises continuously but eventually becomes flatter as it reaches a maximum or ultimate engineering stress. At this point in the stress-strain curve, the material undergoes what is referred to as strain hardening. During this time, as the specimen is elongating, its cross-sectional area decreases uniformly over the specimen's entire length. After the maximum stress is reached, however, the cross-sectional area of the specimen begins to decrease in a localized region, as opposed to over the entire length of the specimen. This results in a region of constriction or necking in the specimen, and ultimately the specimen fractures, which is represented by the endpoints of the curves shown in FIG. 7.

Various formulations of materials exhibit different yield points, yielding regions, strain-hardening regions, maximum stresses, and necking regions, and without being bound by any particular theory the present inventors have found that polymeric compositions having particular yield points, strain hardening regions, maximum stresses, and necking regions characterized by particular ranges of stresses and percent strains exhibit improved processability in blow molding applications. For example, as shown in FIG. 7, the yield point for polymeric compositions that have been used in blow molding applications can occur at an engineering stress of from about 100 kPa to about 450 kPa and at a percent strain of from about 5% to about 25%, such as from about 150 kPa to about 300 kPa at a percent strain of from about 10% to about 20%. Additionally, strain hardening can occur over a range of engineering stresses, such as engineering stresses increasing from about 100 kPa to about 650 kPa over a range of percent strains of about 5% to about 90%, or such as engineering stresses increasing from about 200 kPa to about 600 kPa over a range of percent strains of from about 10% to about 80%. Further, the composition can have a relatively high maximum engineering stress even at relatively high percent strains. For example, the composition can exhibit a maximum engineering stress of from about 450 kPa to about 650 kPa at a percent strain of from about 60% to about 90% or from about 500 kPa to about 600 kPa at a percent strain of from about 70% to about 80%. Also, as shown in FIG. 7, necking can occur over a range of engineering stresses, such as engineering stresses decreasing from about 700 kPa to about 100 kPa over a range of percent strains of from about 60% to about 150%, or such as engineering stresses decreasing from about 600 kPa to about 175 kPa over a range o percept strains of from about 70% to about 120%.

Further, at a percent strain of about 100%, the composition can exhibit an engineering stress of from about 350 kPa to about 550 kPa. Moreover, at a percent strain of about 80%, the composition can exhibit an engineering stress of from about 450 kPa to about 650 kPa, and at a percent strain of 40%, the composition can exhibit an engineering stress of from about 350 kPa to about 550 kPa.

The synergistic effect of blending the components used to formulate compositions of the present disclosure enables significantly improved control during blow molding for producing products having controlled wall thickness with surface smoothness at relatively high extrusion rates.

The linear polyarylene sulfide resin that may be used in the composition of the present disclosure can vary depending upon the particular application and the desired results. Polyarylene sulfide resins that may be used are comprised of repeating units represented by the formula —(—Ar—S—)—, wherein Ar is an arylene group.

Examples of arylene groups that can be present in the linear polyarylene sulfide resin include p-phenylene, m-phenylene, o-phenylene and substituted phenylene groups (wherein the substituent can be an alkyl group having 1 to 5 carbon atoms or a phenyl group), p,p'-diphenylene sulfone, p,p'-biphenylene, p,p'-diphenylene ether, p,p'-diphenylenecarbonyl and naphthalene groups.

Polyarylene sulfides that may be used, in one embodiment, include polyarylene thioethers containing repeat units of the formula:

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, I, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Arylene units include phenylene, biphenylene, naphthylene, anthracene and phenanthrene. The polyarylene sulfide can include at least 30 mole percent, particularly at least 50 mole percent and more particularly at least 70 mole percent arylene sulfide (—S—) units. The polyarylene sulfide polymer can include at least 85 mole percent sulfide linkages attached directly to two aromatic rings.

In one embodiment, the linear polyarylene sulfide polymer is polyphenylene sulfide (PPS), defined herein as containing the phenylene sulfide structure —(C$_6$H$_4$—S)$_n$— (wherein n is an integer of 1 or more) as a component thereof.

Polyphenylene sulfide resins are considered to have a high degree of linearity in cases where they exhibit a complex melt viscosity of less than 13,000 poise at 310° C. and 0.1 rad/sec. In one embodiment, the polyphenylene sulfide resins having a high degree of linearity can exhibit a complex melt viscosity of less than 13,000 poise at 310° C. and 0.1 rad/sec. For purposes of this invention the melt viscosity of the polyphenylene sulfide resin can be determined with an ARES® strain-controlled rheometer (from TA Instruments) operated in dynamic (oscillatory) shear mode using parallel plate geometry with 25 mm disks and a frequency of 0.1 rad/sec at 310° C. For a PPS having a high degree of linearity as defined above per the ARES® rheometer, the corresponding melt viscosity as measured in a capillary rheometer at 310° C., 1200 l/s shear rate can be below 6500 poise.

Synthesis techniques that can be used in making linear polyphenylene sulfide resins that are suitable for utilization in the practice of this invention are described in U.S. Pat. No. 4,814,430, U.S. Pat. No. 4,889,893, U.S. Pat. No. 5,380,783, and U.S. Pat. No. 5,840,830, the teachings of which are incorporated herein by reference in their entirety.

The linear polyarylene sulfide polymer selected for use in the composition of the present disclosure can depend on various factors. For instance, in general a linear polyarylene sulfide polymer should be chosen that is compatible with the molding process, such as a blow molding process, and is compatible with the other components contained in the composition. In general, for instance, the linear polyarylene sulfide polymer can have a melt viscosity of from about 20 Pa·s to about 500 Pa·s (from about 200 poise to about 5,000 poise). As used herein, melt viscosity of the linear polyarylene sulfide polymer is determined in accordance with the ASTM Test No. 1238-70 at 316° C. and at 1200 s$^{-1}$.

A linear polyarylene sulfide polymer selected for use in the present disclosure may also have a relatively low chlorine content. In general, lower melt viscosity polymers generally have a greater chlorine content. Thus, a balance may be struck between selecting a polymer having an appropriate melt viscosity while also selecting a polymer that has a low chlorine content. In one embodiment, the linear polyarylene sulfide polymer may have a chlorine content of less than about 2000 parts per million for generating a composition with a chlorine content of less than 900 parts per million.

Linear polyarylene sulfide polymers that may be used in the present disclosure are available from numerous commercial sources. In one embodiment, for instance, polymers can be purchased from Ticona LLC and/or the Celanese Corporation under the trade name FORTRON®.

In one embodiment, a linear polyarylene sulfide polymer having a relatively high melt viscosity can be combined with a linear polyarylene sulfide polymer having a relatively low melt viscosity for producing a PPS polymer having the desired characteristics.

In addition to a linear polyarylene sulfide polymer, the composition of the present disclosure also contains a branched polyarylene sulfide polymer, particularly a relatively high molecular weight branched polyphenylene sulfide polymer.

The branched polyarylene sulfide polymer may have a branched structure obtained by polymerizing a sulfur compound and a dihalo-aromatic compound in the presence of a polyhalo-aromatic compound having 3 or more halogen substituents.

The dihalo-aromatic compound used may be a dihalogenated aromatic compound having 2 halogen atoms directly bonded to the aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. These dihalo-aromatic compounds may be used either singly or in any combination thereof.

The halogen atom can be fluorine, chlorine, bromine and iodine, and 2 halogen atoms in the same dihalo-aromatic compound may be the same or different from each other. In many cases, o-dichlorobenzene, m-dichlorobenzene, p-dichlorobenzene or a mixture of 2 or more compounds thereof is used as the dihalo-aromatic compound.

The polyhalo-aromatic compound having 3 or more halogen substituents is used for introducing a branched structure into the polyphenylene sulfide resin. A halogen substituent is generally a halogen atom directly bonded to the aromatic ring. The halogen atom can be fluorine, chlorine, bromine and iodine, and plural halogen atoms in the same dihalo-aromatic compound may be the same or different from each other.

Specific examples of the polyhalo-aromatic compound include 1,2,3-trichlorobenzene, 1,2,4-trichlorobenzene, 1,3,5-trichlorobenzene, hexachlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone and 2,4,2'-trichlorobenzophenone.

These polyhalo-aromatic compounds may be used either singly or in any combination thereof. Among the polyhalo-aromatic compounds, trihalobenzenes such as trichlorobenzenes including 1,2,4-trichlorobenzene and 1,3,5-trichlorobenzene are can be used.

In one embodiment, branching may be achieved by copolymerizing with a trifunctional monomer such as trichlorobenzene in a molar weight proportion of 0.3 to 8%, such as from about 1% to about 5%. Branching may be obtained by first obtaining a linear polymer with the difunctional monomer which is then solid stated to a higher molecular weight by heating the polymer in air or air/nitrogen mixture and at temperatures between the glass transition temperature (80° C.) and melting point transition (275° C.) for an extended time. When high level of branching is achieved, the viscosity of the polyphenylene sulfide may be very high.

One process for producing branched polyarylene sulfide resins comprises (1) an initial-stage polymerization step (A) of reacting an alkali metal sulfide, a dihaloaromatic compound (hereinafter referred to as "DHA") and a polyhaloaromatic compound which has more than two halogen substituents in a molecule (hereinafter referred to as "PHA"), in an organic amide solvent under the presence of water in an amount of 0.5 to 2.9 moles per mol of said alkali metal sulfide, at a temperature in the range of 180° to 235° C. until a total conversion of DHA and PHA reaches 50 to 98% and a melt viscosity of a polyarylene sulfide obtained at the end of the step, becomes 5 to 5,000 poise measured at 310° C. and a shear rate of 1,200/second; (2) a temperature raising step (B) in which while adjusting the amount of water to be 2.5 to 7 moles per mol of the fed alkali metal sulfide, a temperature raising condition of the reaction mixture until it reaches to 240° C. is controlled so that the melt viscosity of the prepolymer obtained at 240° C., is 300 to 10,000 poise, measured at 310° C. and a shear rate of 1,200/second, and the temperature raising condition between 240° C. and the reaction temperature of the next step (C) is further controlled to be within the range of 10° to 100° C./hour; and (3) a second-stage polymerization step (C) for further reacting the reaction mixture at a temperature in the range of 245° to 290° C. until the melt viscosity of the final polymer becomes 100,000 poise or more as measured at 330° C. and a shear rate of 2/second.

In general, the branched polyarylene sulfide resin may have a melt viscosity of from about 100,000 Pa·s to about 300,000 Pa·s when measured at a temperature of 330° C. and at a shear rate of 2 sec$^{-1}$. The average molecular weight of the polyarylene sulfide resin, in one embodiment, is from about 15,000 to about 40,000, such as from about 22,000 to about 30,000 gram/mol. The number average molecular weight of the polymer can be from about 3,000 to about 10,000, such as from about 4,500 to about 9,000 gram/mol.

In general, the polyarylene sulfide resins are present in the composition in an amount greater than about 35% by weight. For instance; the polyarylene sulfide resins may be present in an amount greater than about 50% by weight, such as in an amount greater than 60% by weight, such as in an amount greater than 70% by weight. The polyarylene sulfide resins are generally present in an amount less than about 95% by weight, such as in an amount less than about 90% by weight.

The relative proportions of the branched polyarylene sulfide resin in relation to the linear polyarylene sulfide resin can vary depending upon various factors. The factors include the other components contained in the composition and the desired properties that are to be obtained. In general, the weight ratio between the branched polyarylene sulfide resin and the linear polyarylene sulfide resin is generally from about 1:5 to about 1:60, such as from about 1:20 to about 1:50, such as from about 1:30 to about 1:40.

In one embodiment, the composition of the present disclosure contains the linear polyphenylene sulfide resin in an amount from about 50% to about 90% by weight, such as in an amount from about 60% to about 80% by weight. The branched polyphenylene sulfide resin, on the other hand, may be present in the composition in an amount from about 0.5% to about 30% by weight, such as in an amount from about 1% to about 15% by weight.

In general, the combination of a linear polyarylene sulfide resin with a branched polyarylene sulfide resin has been found to dramatically increase the low shear rate storage modulus of the composition. In accordance with the present disclosure, various other components may be contained in the composition either alone or in combination with the polyarylene sulfide resins in order to further improve the stress-strain characteristics, melt viscosity characteristics, shear rate storage modulus characteristics, or other characteristics and properties that either relate to the polymer when in a fluid state or to the final article produced during the molding process.

In one embodiment, for instance, the polymeric composition further contains a polyphenylene oxide in combination with a compatibilizer.

The polyphenylene oxide polymer, for instance, may comprise a thermoplastic, linear, noncrystalline polyether. The polyphenylene oxide polymer may provide various advantages and benefits to the overall composition. In one embodiment, for instance, the polyphenylene oxide polymer may be included in the composition in order to increase heat stability.

Polyphenylene oxides can be prepared by a variety of processes, such as by the thermal decomposition of 3,5-dibromobenzene-1,4-diazooxide, the oxidation of halogenated phenols, through a condensation reaction, and the refluxing of potassium or silver halogenated phenates in benzophenone.

In one embodiment, the polyphenylene oxide polymer may have recurring units of the formula:

wherein R and R' may be the same or different and are hydrogen atoms, halogen atoms, substituted and unsubstituted hydrocarbon groups, halohydrocarbons, alkoxy groups or phenoxy groups. For example, R and R' can be $CH_3$, $CH_2CH_3$, isopropyl, $CH_3O$, $CH_2C_6H_5$, Cl, and $C_6H_5$. R and R' can be hydrocarbon groups of from one to eight carbon atoms, including aliphatic, cycloaliphatic and aromatic groups. Further, R and R' can be the same.

One polyphenylene oxide that may be used is poly(2,6-dimethyl-1,4-phenylene oxide).

When present, the polyphenylene oxide can generally be contained in the composition in an amount from about 3% to about 50% by weight, such as in an amount from about 10% to about 30% by weight.

In addition to or instead of a polyphenylene oxide, the composition may contain other polymers. Other polymers may include, for instance, high temperature polyamides (melting temperature greater than 270° C., such as greater than 300° C.), a liquid crystal polymer such as an aromatic polyester polymer, a polyethyleneimine polymer, or the like. The above polymers can be present alone or in combination with other polymers in the weight percentages described above.

The polymer composition can also contain a compatibilizer. The compatibilizer can be present to provide strengthening of the interphase between the polyarylene sulfide and other components. In some embodiments the compatibilizer can be a graftlinking additive such as those illustrated below as (i), (ii) and (iii), wherein:
(i) has the structure:

wherein R and $R^1$ can be the same or different and represent a monovalent alkyl, alkenyl, alkynyl, aralkyl, aryl or alkaryl group of 1 to 20 carbon atoms, or an ether substituted derivative thereof, or a halogen, wherein $R^2$ represents a monovalent alkyl, alkenyl, alkynyl, aralkyl, aryl or alkaryl group of 1 to 20 carbon atoms, or an ether substituted derivative thereof, or an oxy derivative or an ether substituted oxy derivative thereof or a halogen, wherein A, B and C represent a monovalent aroxy group, a thioaroxy group, a diester phosphate group, a diester pyrophosphate group, a oxyalkylamino group, a sulfonyl group, or a carboxyl group, wherein a, b, and c represent integers, and wherein the sum of a, b, and c is 3;
(ii) has the structure:

wherein each $R^1$ represents an alkyl radicals having from 1 to 8 carbon atoms, wherein $R^2$ represents a divalent radical selected from the group consisting of alkylenes having 1 to 15 carbon atoms, arylene and alkyl substituted arylene groups having 6 to 10 carbon atoms, wherein W represents an epoxy group; wherein y represents an integer of from 1 to 3, wherein z represents an integer from 1 to 3, wherein the sum of y and z equals 4, and wherein X represents titanium or zirconium; and
(iii) has the structure:

in which Z is selected from the group consisting of where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Compounds of the type (iii) as compatibilizers are disclosed in U.S. Pat. No. 5,149,731, the teachings of which are incorporated herein by reference in their entirety.

The compatibilizers can be alkoxysilane compounds or organosilane compounds selected from the group consisting of a vinlyalkoxysilanes, epoxyalkoxysilanes, aminoalkoxysilanes, and mercaptoalkoxysilanes. Examples of the vinylalkoxysilane that can be utilized include vinyltriethoxysilane, vinyltrimethoxysilane and vinyltris(β-methoxyethoxy)silane. Examples of the epoxyalkoxysilanes that can be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that can be employed include γ-mercaptopropyltrimethoxysilane and γ-mercaptopropyltriethoxysilane.

Amino silanes are a class of alkoxy silanes that can be used in the practice of compatibilizing polyarylene sulfide and other components and are typically of the formula: $R^1$—Si—$(R^2)_3$, wherein $R^1$ is selected from the group consisting of an amino group such as $NH_2$; an aminoalkyl of from about 1 to about 10 carbon atoms, such as from about 2 to about 5 carbon atoms, such as aminomethyl, aminoethyl, aminopropyl, aminobutyl, and the like; an alkene of from about 2 to about 10 carbon atoms, such as from about 2 to about 5 carbon atoms, such as ethylene, propylene, butylene, and the like; and an alkyne of from about 2 to about 10 carbon atoms, such as from about 2 to about 5 carbon atoms, such as ethyne, propyne, butyne and the like; and wherein $R^2$ is an alkoxy group of from about 1 to about 10 atoms, such as from about 2 to about 5 carbon atoms, such as methoxy, ethoxy, propoxy, and the like. In one embodiment, in the amino silane compound of the $R^1$—Si—$(R^2)_3$, $R^1$ is selected from the group consisting of aminomethyl, aminoethyl, aminopropyl, ethylene, ethyne, propylene and propyne, and $R^2$ is selected from the group consisting of methoxy groups, ethoxy groups, and propoxy groups.

The amino silane compound can be of the formula: $R^3$—Si—$(R^4)_3$, wherein $R^3$ is an amino group such as $NH_2$ or an aminoalkyl of from about 1 to about 10 carbon atoms such as aminomethyl, aminoethyl, aminopropyl, aminobutyl, and the like, and wherein $R^4$ is an alkoxy group of from about 1 to about 10 atoms, such as methoxy groups, ethoxy groups, propoxy groups, and the like. The amino silane can also be of the formula: $R^5$—Si—$(R^6)_3$ wherein $R^5$ is selected from the group consisting of an alkene of from about 2 to about 10 carbon atoms such as ethylene, propylene, butylene, and the like, and an alkyne of from about 2 to about 10 carbon atoms such as ethyne, propyne, butyne and the like, and wherein $R^6$ is an alkoxy group of from about 1 to about 10 atoms, such as methoxy group, ethoxy group, propoxy group, and the like. The amino silane can be a mixture of various compounds of the formula $R^1$—Si—$(R^2)_3$, $R^3$—Si—$(R^4)_3$, and $R^5$—Si—$(R^6)_3$.

Some representative amino silanes that can be used include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl)tetraethoxy disiloxane, and combinations thereof. The amino silane can also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One amino silane that can be used is 3-aminopropyltriethoxysilane, which is available from Degussa, Sigma Chemical Company, and Aldrich Chemical Company.

In other embodiments, the compatibilizer may be provided by a modified polyphenylene ether, such as an epoxy triazine capped polyphenylene ether as disclosed in Han et al., U.S. Pat. No. 5,122,578, which is incorporated herein by reference. Another end-cap for PPO is epoxy chlorotriazine. Yet another compatibilizer is disclosed in Khouri et al., U.S. Pat. No. 5,132,373 such as an ortho ester capped poly(phenylene ether). Khouri et al., U.S. Pat. No. 5,212,255 sets out ortho ester grafted poly(phenylene ether) resins and methods for preparation thereof, and is incorporated herein by reference.

In yet further embodiments, the compatibilization of polyarylene sulfide with other components can be provided by a modified polyarylene sulfide polymer which contains functional groups which may include, but are not limited to, amino, carboxylic acid, metal carboxylate, disulfide, thio and metal thiolate groups. A method for incorporation of functional groups into PPS can be found in U.S. Pat. No. 4,769,424, incorporated herein by reference, which discloses incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronaphthalene.

In one embodiment, the polymeric composition further contains a viscosity stabilizer, such as a polytetrafluoroethylene polymer. When present, the polytetrafluoroethylene polymer has a tendency to make the viscosity of the composition during extrusion more uniform. In particular, the polytetrafluoroethylene polymer inhibits the formation of small domains of low viscosity areas during melt processing that can lead to irregularities in the finished product, such as non-uniform wall thicknesses.

In addition, the polytetrafluoroethylene can contribute to the high melt strength and melt elongation of the polymeric composition. Because PTFE can have a melting temperature of from about 320° C. to about 340° C. and the polymeric composition can be compounded at a temperature of from about 330° C. to about 375° C., the PTFE is fully melted during compounding and thus can be well distributed within the polymeric composition. However, during blow molding, the processing temperature is only from about 290° C. to about 310° C., which means that the PTFE remains in a solid state, thus providing for higher melt strength while at the same time providing for increased melt elongation.

Polytetrafluoroethylene is commonly known by the federally registered trademark TEFLON which is the name for compounds marketed by E. I. DuPont de Nemours Co., Inc.; FLUON which is the name for compounds marketed by ICI Americas; and WHITCON 2 which is the name of a particulate powder marketed by ICI Americas. Such materials are recognized for heat resistance and friction-reduction as when used, for example, on the surfaces of kitchen utensils and for other mechanical applications. Such materials are available in various forms. This more common form of particulate PTFE is manufactured by grinding or fracturing larger PTFE particles into powdered particulate PTFE.

In general, the polytetrafluoroethylene polymer may be present in the composition in an amount from about 0.01% to about 5% by weight, such as in an amount from about 0.1% to about 2% by weight. In one particular embodiment, the polytetrafluoroethylene polymer has a specific gravity of from about 2.0 g/cm$^3$ to about 2.3 g/cm$^3$, such as from about 2.1 g/cm$^3$ to about 2.2 g/cm$^3$. In one particular embodiment, the polytetrafluoroethylene polymer has a specific gravity of about 2.15 g/cm$^3$.

The polymeric composition can also contain a reinforcing agent, such as reinforcing fibers or mineral fillers. In one embodiment, for instance, the resin composition may contain glass reinforcing fibers. Any suitable glass fibers may be included in the composition. In one embodiment, for instance, the fibers may be comprised of lime-aluminum borosilicate glass.

Other reinforcing fibers that may be used in accordance with the present disclosure include carbon fibers, metal fibers, aromatic polyamide fibers, rockwool fibers, shape memory alloy fibers, boron fibers, poly(p-phenylene-2,6-benzobisoxazole) fibers, and mixtures thereof. Carbon fibers that may be used include amorphous carbon fibers, graphitic carbon fibers, or metal-coated carbon fibers. Metal fibers may include stainless steel fibers, aluminum fibers, titanium fibers, magnesium fibers, tungsten fibers, and the like.

Fiber diameters can vary depending upon the particular fiber used and are available in either chopped or continuous form. The reinforcing fibers, for instance, can have a diameter of less than about 100 microns, such as less than about 50 microns. For instance, chopped or continuous fibers can have a fiber diameter of from about 5 microns to about 50 microns, such as from about 5 microns to about 15 microns. If desired, the fibers may be pretreated with a sizing that may also facilitate mixing with the polymer. Fiber lengths can be controlled by one skilled in the art during compounding varying compounding conditions (e.g. temperature profile, rate and shear or screw speed) and screw design (control intensity of mixing) used to mix and/or disperse the fiber in the polymeric composition. In one embodiment, for instance, the fibers can have an initial length of from about 3 mm to about 5 mm while the final length after compounding could vary from 100 microns to 1500 microns depending on choice of compounding conditions and screw design used in compounding.

The reinforcing fibers can be present within the resulting article in an amount from about 10% to about 50% by weight, such as from about 10% to about 25% by weight.

Suitable mineral fillers that may be included in the resin composition include talc, clay, silica, calcium silicate, calcium sulfate, barium sulfate, mica, calcium carbonate, titanium dioxide, mixtures thereof, and the like. The fillers may be present in the composition in the amount from about 0.5% to about 30% by weight, such as from about 5% to about 25% by weight.

In addition to the polyarylene sulfide polymers and other components described above, the composition of the present disclosure can further contain an impact modifier.

In one embodiment, an impact modifier is selected that is chemically reactive with the compatibilizer. In one embodiment, for instance, the impact modifier may comprise a random copolymer of a polyolefin and glycidyl methacrylate. For instance, in one embodiment, the impact modifier may comprise a random copolymer of polyethylene and glycidyl methacrylate. The amount of glycidyl methacrylate contained in the random copolymer may vary. In one particular embodiment, the random copolymer contains the glycidyl methacrylate in an amount from about 6% to about 10% by weight.

The above impact modifier may combine with an organosilane compatibilizer and the polyphenylene sulfide resins so as to raise the low shear viscosity, melt elongation, and melt strength of the composition. Thus, in one embodiment, the impact modifier is present in the composition in an amount from about 0.5% to about 10% by weight.

Fiber reinforced polymeric compositions as described above possess an optimal combination of properties. Compositions formulated in accordance with the present disclosure have a relatively high near zero shear rate melt strength and engineering stress at a high percent strain, but yet still have a processable high shear rate melt viscosity. The above combination of properties allows the thermoplastic material to hold its shape at close to melt temperature, which becomes very important in processes for blow molding parts with complex shapes.

Having a high melt viscosity and a high low shear rate storage modulus, for instance, provides better control of the polymer during extrusion or molding of the parison. For instance, the composition of the present disclosure enables extrusion blow molding of articles with uniform wall thickness and smooth interior surfaces. In addition, the polymeric composition allows for high extrusion rates. Further, having a high engineering stress at a high percent strain enhances the ability to achieve complex three-dimensional manipulation processing of the parison. Due to the improved processability of the composition, the composition leads to higher throughput at a lower scrap rate than a comparative product.

Figure 1:
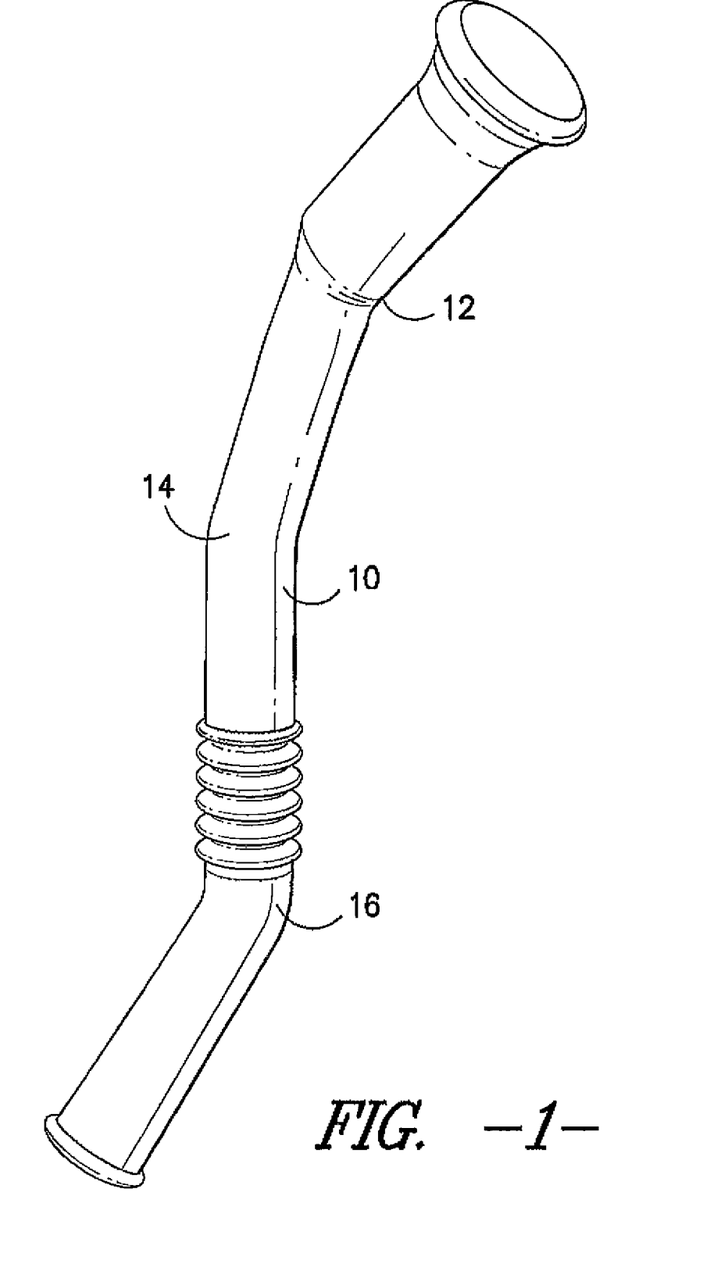
FIG. 1 is a perspective view of one embodiment of a shaped article that may be made in accordance with the present disclosure.

Referring to FIG. 1, one embodiment of a shaped article made in accordance with the present disclosure is shown. As shown, in this embodiment, the shaped article comprises a tubular member 10. The tubular member 10 can be made according to a blow molding process. As shown, the tubular member 10 extends in multiple directions leading to a relatively complex shape. For instance, before the polymeric composition can solidify, the angular displacements as shown in FIG. 1 are formed into the part. The tubular member 10 includes angular displacement changes at 12, 14 and 16. The tubular member 10 may comprise, for instance, a part that may be used in the exhaust system of a vehicle. During blow molding, a pressurized gas, such as an inert gas, is forced against the interior surface of the tubular member. The compositions of the present disclosure allow the extrusion of the parison with uniform wall thickness and without the polymer creating melt fractures or other imperfections.

Figure 2:
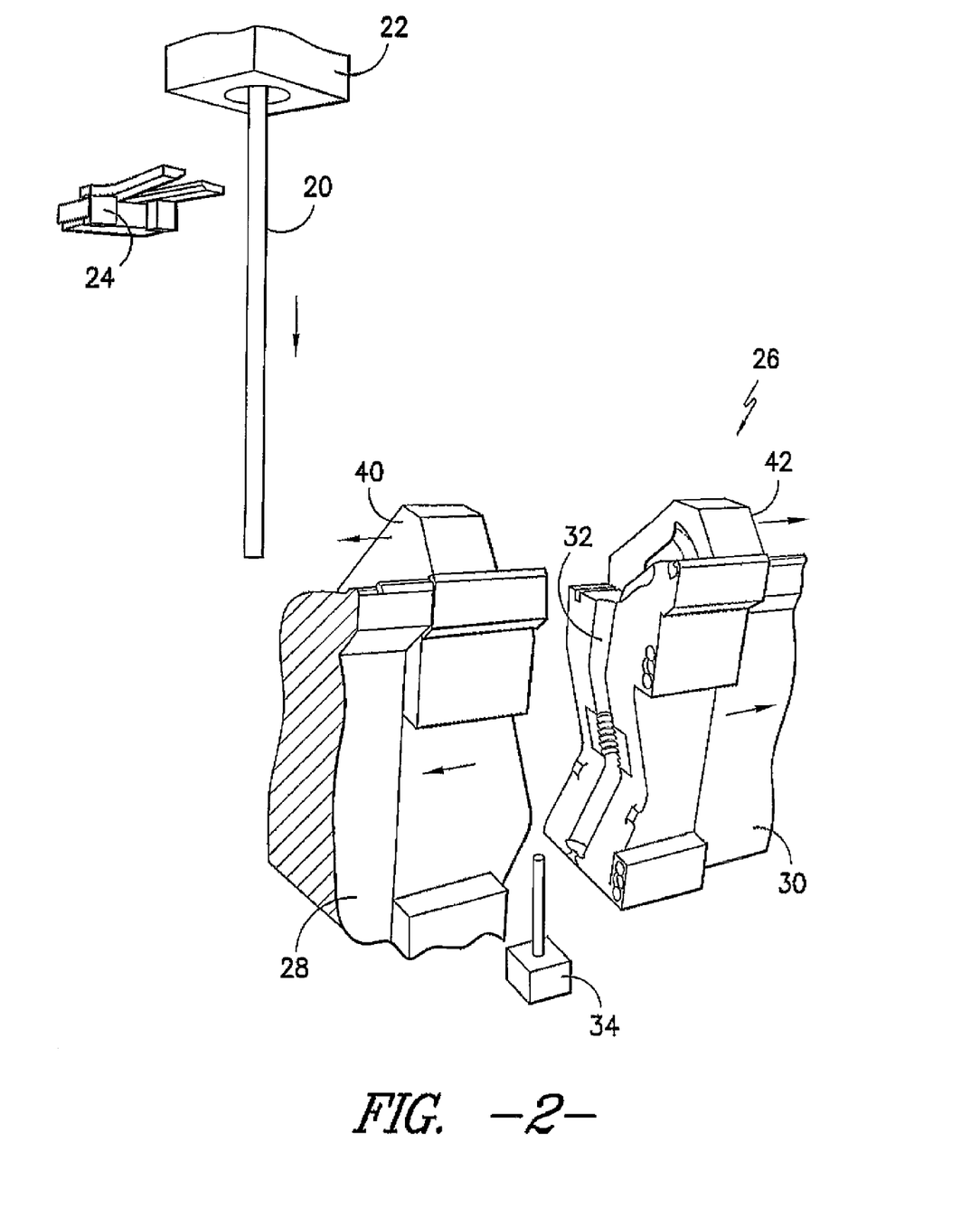
FIGS. 2 through 6 illustrate one process for forming the shaped article illustrated in FIG. 1.

One process for making the tubular member 10 as shown in FIG. 1 is illustrated sequentially in FIGS. 2 through 6. Referring to FIG. 2, for instance, the polymeric composition of the present disclosure is first heated and extruded into a parison 20 using a die 22 attached to an extrusion device. As shown, the parison 20 is extruded into a downward direction. When the parison 20 is formed as shown in FIG. 2, the composition used to form the parison must have sufficient melt strength to prevent gravity from undesirably elongating portions of the parison and thereby forming non-uniform wall thicknesses and other imperfections. On the other hand, the melt elongation must also be sufficiently high to allow for processability of the composition. Thus, there must be a balance between a high enough melt strength and a high enough melt elongation in order to form the tubular member 10 that can be easily processed while maintaining uniform wall thickness. In other words, the engineering stress must be sufficiently high at a high percent strain to allow for processability of the composition.

As shown in FIG. 2, the parison 20 is extruded adjacent a clamping mechanism 24 which is typically attached to a robotic arm. Also positioned to receive the parison 20 is a molding device 26. In the embodiment illustrated, the molding device 26 includes a first portion 28 and a second portion 30 which together combine to form a three-dimensional mold cavity 32. In the embodiment illustrated, both portions 28 and 30 of the molding device move towards and away from each other. In an alternative embodiment, however, one portion may remain stationary while only the other portion moves.

Figure 3:
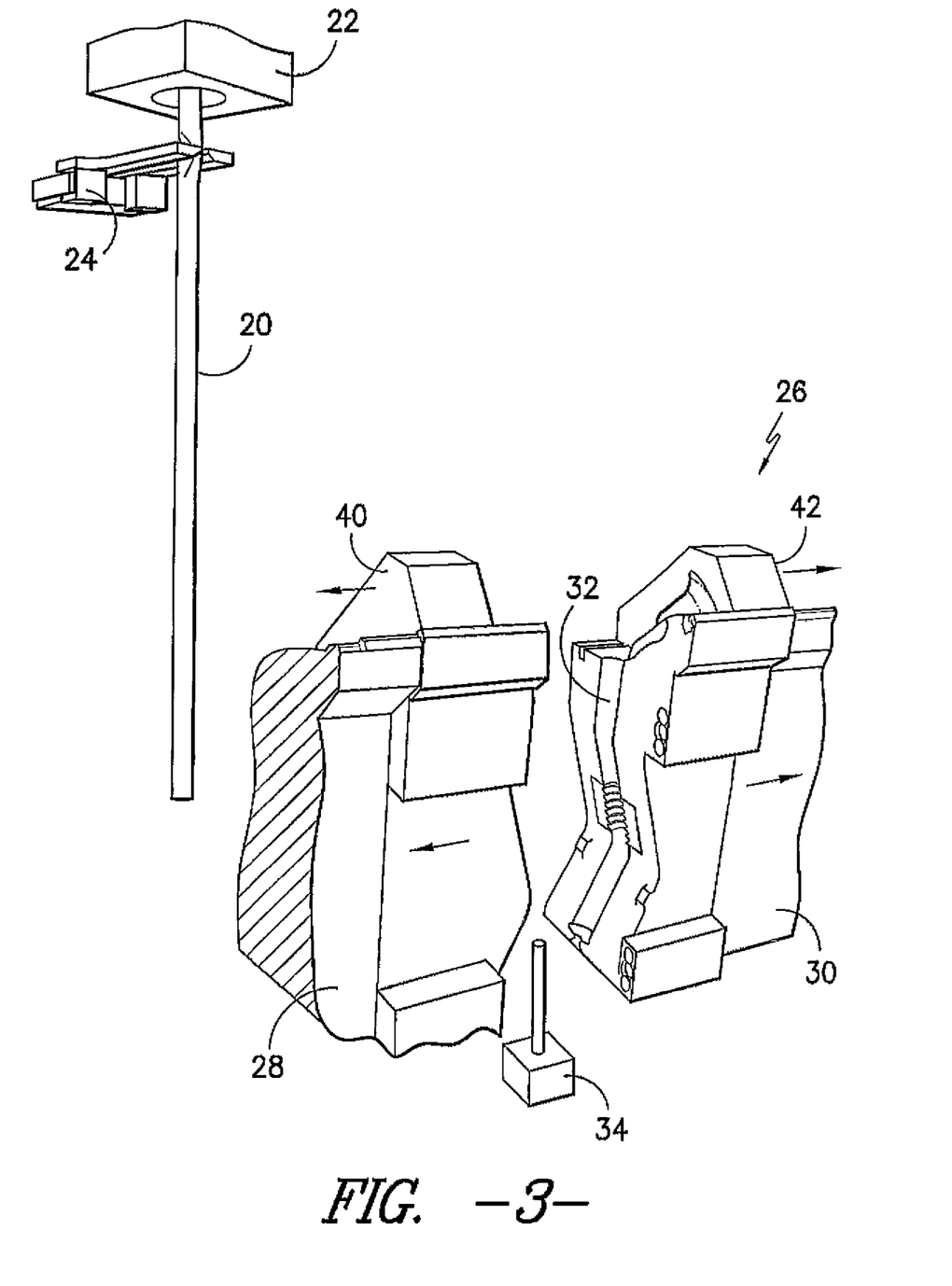
Figure 4:
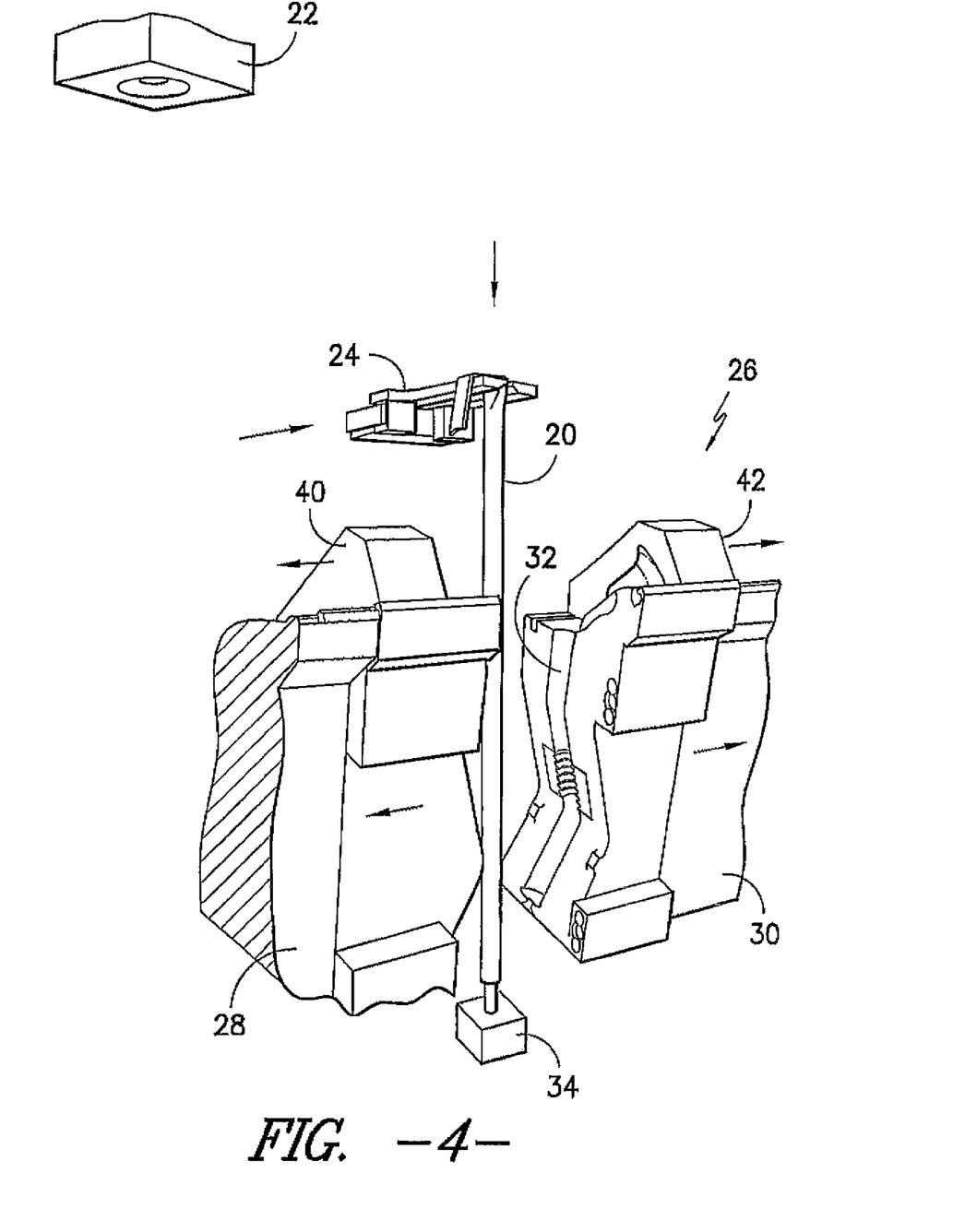

Referring to FIG. 3, the next step in the process is for the clamping mechanism 24 to engage a top of the parison 20 after the parison 20 has reached a desired length. As shown in FIG. 4, the clamping mechanism then moves the parison into a position so that the parison can interact with the molding device 26. The clamping mechanism 24 can be moved with the aid of a robotic arm.

As can be appreciated, a certain period of time elapses from formation of the parison 20 to clamping and moving the parison 20 into engagement with the molding device 26. During this stage of the process, the melt strength of the polymeric composition should be high enough such that the parison 20 maintains its shape during movement. The polymeric composition should also be capable of remaining in a semi-fluid state and not solidifying too rapidly before blow molding commences.

As shown in FIG. 4, the robotic arm also engages the bottom of the parison 20 with a fluid supply device 34 which is used during blow molding.

Figure 5:
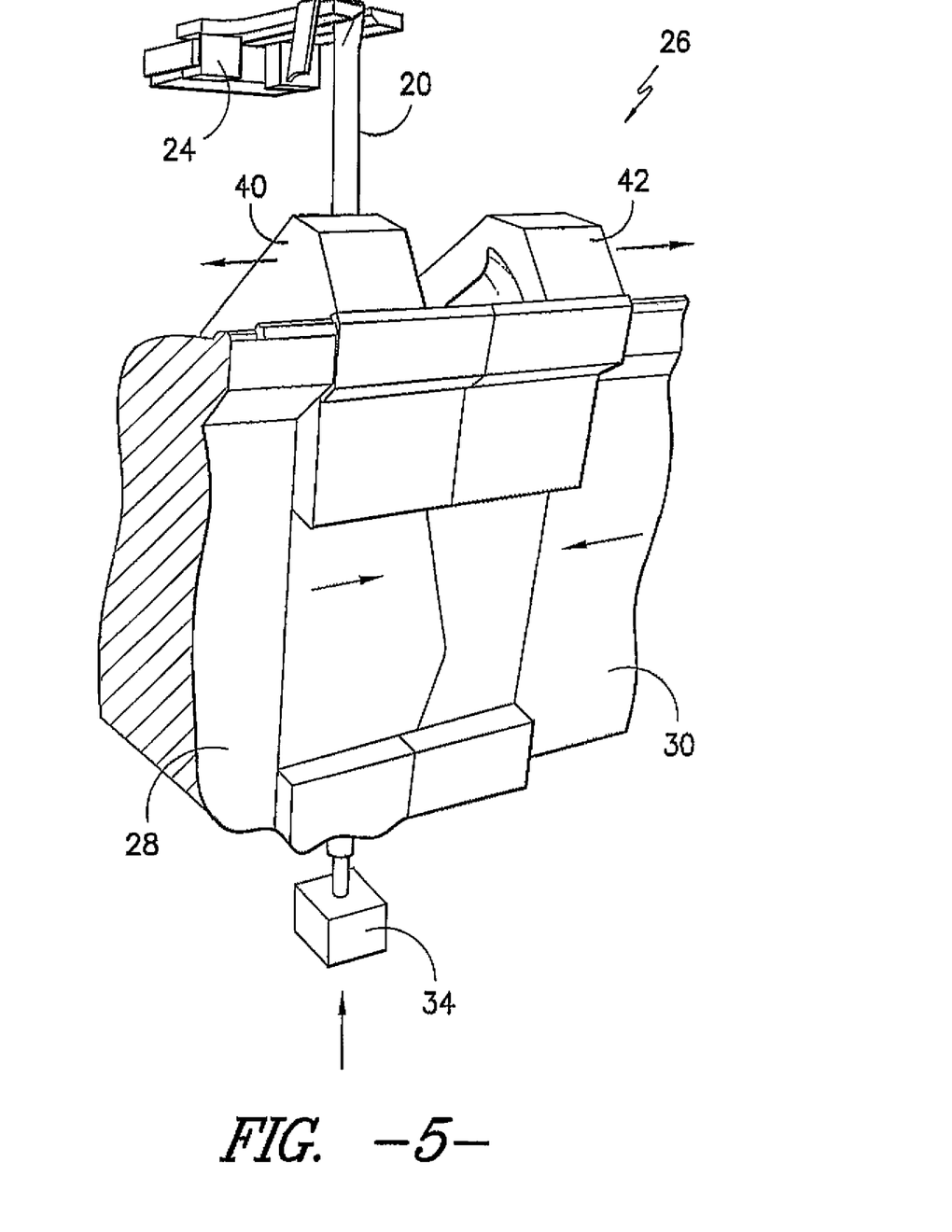

Referring to FIG. 5, once the parison 20 has been moved into position, the first portion 28 and the second portion 30 of the molding device 26 move together such that the parison 20 partially extends through the mold cavity 32 as shown in FIG. 4.

As shown in FIG. 5, the first portion 28 includes a top section 40 and the second portion 30 includes a top section 42. In the embodiment illustrated, the bottom sections of the molding device 26 first close leaving the top sections 40 and 42 open. In this manner, the parison 20 can first engage the bottom portion of the molding cavity 32. The clamping device 24 can then robotically move the top of the parison prior to closing the top sections 40 and 42 of the molding device. Once the clamping mechanism is properly located, as shown in FIG. 6, the top sections of the mold close such that the parison extends the entire length of the mold cavity.

Figure 6:
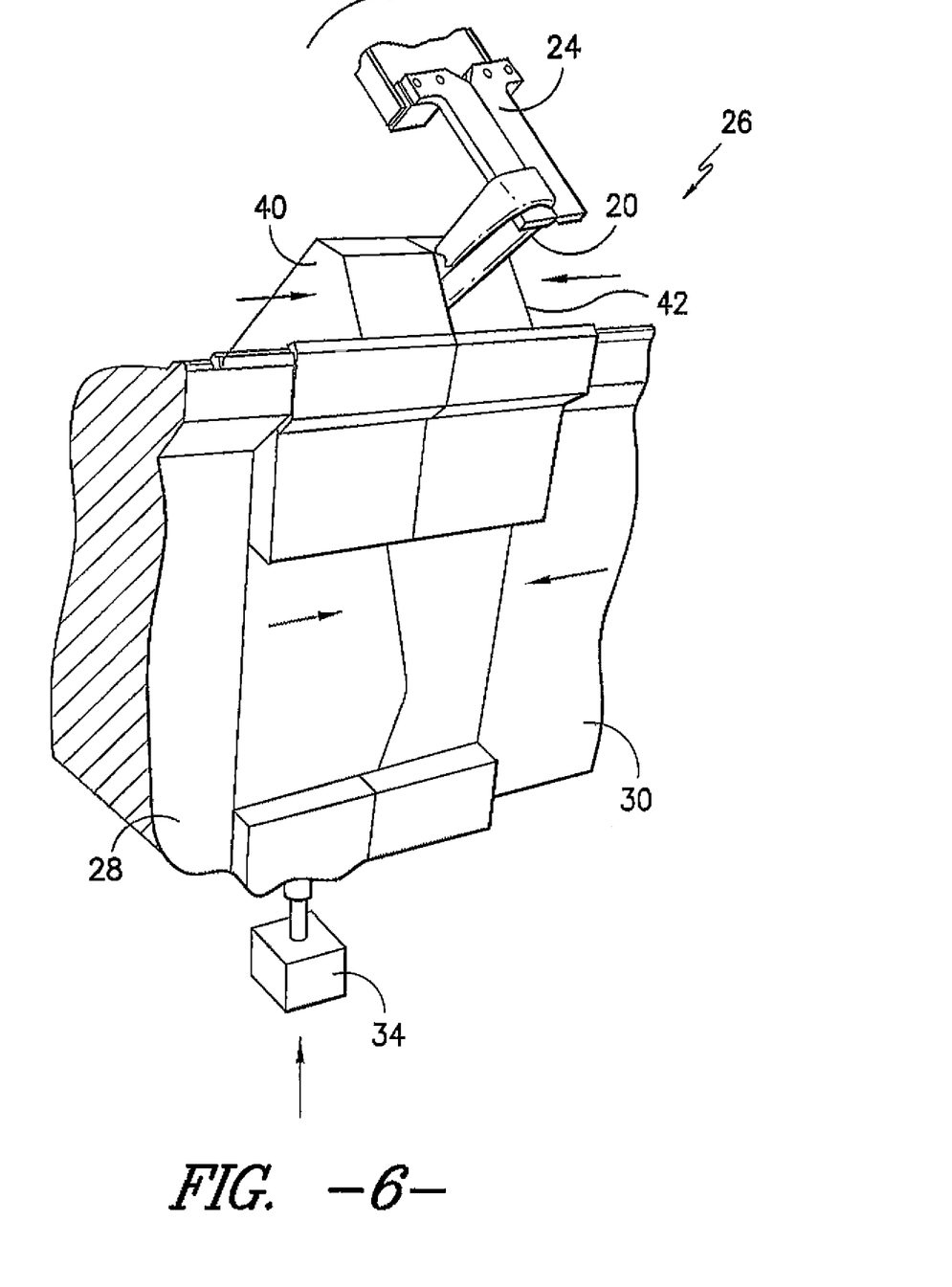

Having separately movable top sections as shown in FIGS. 5 and 6 are needed in some molding applications when complex shapes are being formed. By having separate sections of the mold surround the parison at different times allows a robotic arm to continue to manipulate the parison in order to place in the resulting part many angular displacements.

Once the top sections 40 and 42 of the molding device 26 are closed as shown in FIG. 6, a gas, such as an inert gas, is fed into the parsion 20 from the gas supply 34. The gas supplies sufficient pressure against the interior surface of the parison such that the parison conforms to the shape of the mold cavity 32.

After blow molding, the finished shaped article is then removed and used as desired. In one embodiment, cool air can be injected into the molded part for solidifying the polymer prior to removal from the molding device 26.

The present disclosure may be better understood with reference to the following example.

EXAMPLE

Various compositions (samples 1-8) were formulated in accordance with the present disclosure. The compositions contained a linear polyphenylene sulfide resin combined with a branched polyphenylene sulfide resin. A comparative composition (1115L0) was also formulated that only contained a linear polyphenylene sulfide resin. As shown in FIG. 7 and discussed above, stress strain curves were plotted for the comparative sample as well as samples 1-8 in order to determine the engineering stress at various percent elongations. The compositions were also tested for low shear rate storage modulus, melt viscosity, and tensile strength. These data are summarized in the chart below.

The compositions were made with the following components:

1. A linear polyphenylene sulfide resin having a melt viscosity of 140 Pa·s measured at 1200 $s^{-1}$ at 316° C.
2. A branched polyphenylene sulfide resin.
3. Glass fibers having an average diameter of 10 microns.
4. A polytetrafluoroethylene powder which had a specific gravity of 2.15 $g/cm^3$.
5. An aminosilane coupling agent which was product number KBE-903 commercially available from the Shin-Etsu Chemical Company.
6. An impact modifier that comprised a random copolymer of ethylene and glycidyl methacrylate wherein the glycidyl methacrylate content was 8% by weight.
7. A polymer lubricant obtained from Lonza, Inc. under the name GLYCOLUBE, which is a pentaerythritol tetrastearate.
8. Color pigment.

The following results were obtained:

|  | Comparative (1115L0) | Sample No. 1 | Sample No. 2 | Sample No. 3 | Sample No. 4 | Sample No. 5 | Sample No. 6 | Sample No. 7 | Sample No. 8 |
|---|---|---|---|---|---|---|---|---|---|
| Linear Polyphenylene Sulfide | 81.6 | 74.3 | 74.3 | 77.7 | 65.9 | 69.3 | 76.9 | 66.7 | 69.3 |
| Branched Polyphenylene Sulfide |  | 2 | 2 | 2 | 10 | 10 | 2 | 10 | 10 |
| Glass Fibers | 15 | 15 | 15 | 15 | 15 | 15 | 15 | 15 | 15 |
| Aminosilane (Compatibilizer) | 0.6 | 0.3 | 0.7 | 0.3 | 0.7 | 0.3 | 0.7 | 0.3 | 0.7 |
| Lubricant | 0.3 | 0.3 | 0.3 | 0.3 | 0.3 | 0.3 | 0.3 | 0.3 | 0.3 |
| Color pigment | 2.5 | 2.5 | 2.5 | 2.5 | 2.5 | 2.5 | 2.5 | 2.5 | 2.5 |
| Impact Modifier |  | 5 | 5 | 2 | 5 | 2 | 2 | 5 | 2 |
| PTFE |  | 0.6 | 0.2 | 0.2 | 0.6 | 0.6 | 0.6 | 0.2 | 0.2 |
| Engineering stress (kPa) @ 100% strain @ 300° C., 5 $s^{-1}$ | 437 | 117 | 193 | 85 | 153 | 257 | 465 | 165 |  |
| Engineering stress (kPa) @ 40% strain @ 300° C., 5 $s^{-1}$ | 325 | 374 | 332 | 215 | 234 | 437 | 426 | 427 | 628 |
| Maximum engineering stress (kPa) and corresponding % strain @ 300° C., 5 $s^{-1}$ | 467/115 | 392/42 | 351/48 | 224/42 | 246/42 | 481/48 | 585/74 | 467/48 | 683/48 |
| Low Shear Rate Storage Modulus (G') (Pa) @ 0.1 rad/sec, 310° C. | 1000 | 1920 | 3025 | 568 | 12519 | 2458 | 1834 | 2403 | 5318 |
| Melt Viscosity (Kpoise) @ 316° C., 400 $s^{-1}$ | 5.50 | 5.51 | 10.01 | 4.02 | 11.63 | 5.69 | 6.75 | 6.58 | 10.37 |
| Tensile strength (MPa) | 136.00 | 112.45 | 112.12 | 115.68 | 114.29 | 123.77 | 124.56 | 114.19 | 123.95 |

As shown above and in FIG. 7, certain compositions formulated according to the present disclosure generally exhibited higher engineering stresses at higher percent elongations than the comparative 1115L0. By varying the percentages of certain components in the compositions, the inventors have found that some of the formulations, such as sample 6, demonstrated a higher melt viscosity, a higher low shear rate storage modulus, and a higher engineering stress than the comparative sample 1115L0, which can contributed to improved processability of the composition in molding applications.

In particular, at least sample 6 demonstrates improved processability as, for example, compared to the processability of comparative sample 1115L0. The inventors have found that the relationship between the engineering stress and the percent strain contributes to the improved processability over 1115L0. For example, the formulation of sample 6 can exhibit high engineering stresses at high percent strains, which aids in the processability of the formulation during blow molding.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A shaped polymer article comprising:
a blow molded hollow member including an interior surface and an exterior surface and having a wall thickness between the interior surface and the exterior surface, the hollow member being made from a fiber reinforced polymeric composition comprising on a weight percent basis:
a) a linear polyphenylene sulfide having a melt viscosity of from about 20 Pa.s to about 500 Pa.s;
b) a branched polyphenylene sulfide, the weight ratio of the branched polyphenylene sulfide to the linear polyphenylene sulfide being from about 1:5 to about 1:60, the linear polyphenylene sulfide and the branched polyphenylene sulfide being present in the composition in an amount of at least about 35% by weight;
c) reinforcing fibers present in the composition in an amount from about 10% to about 50% by weight;
d) a compatibilizer present in the composition in an amount from about 0.1% to 5% by weight;
e) a polytetrafluoroethylene present in the composition in an amount from about 0.01% to about 3% by weight; and
f) a reactive impact modifier present in the composition in an amount from about 0.5% to about 10% by weight;
wherein the composition has a melt viscosity of at least about 3500 poise measured at 316° C. and at 400 s$^{-1}$, has a low shear rate storage modulus of at least about 1500 Pa measured at 310° C. and at 0.1 rad/s, and has an engineering stress of at least about 350 kPa at a percent strain of about 100%.

2. A shaped polymer article as defined in claim 1, wherein the composition has a yield point that occurs at an engineering stress of from about 100 kPa to about 450 kPa at a corresponding percent strain of from about 5% to about 25%.

3. A shaped polymer article as defined in claim 1, wherein the composition has a maximum engineering stress of from about 450 kPa to about 650 kPa, wherein the maximum engineering stress occurs at a corresponding percent strain of from about 60% to about 90%.

4. A shaped polymer article as defined in claim 1, wherein the composition has a melt viscosity of from about 4000 poise to about 12,500 poise measured at 316° C. and at 400 s$^{-1}$, wherein the composition also has a low shear rate storage modulus of from about 1600 Pa to about 6000 Pa measured at 310° C. and at 0.1 rad/s, and wherein the composition has an engineering stress of from about 350 kPa to about 550 kPa at a percent strain of about 100%.

5. A shaped polymer article as defined in claim 1, wherein the impact modifier comprises a random copolymer of a polyolefin and glycidyl methacrylate.

6. A shaped polymer article as defined in claim 5, wherein the impact modifier comprises a random copolymer of polyethylene and the glycidyl methacrylate, the glycidyl methacrylate being present in the impact modifier in an amount from about 6% to about 10% by weight.

7. A shaped polymer article as defined in claim 1, wherein the compatibilizer comprises an organosilane coupling agent.

8. A shaped polymer article as defined in claim 7, wherein the organosilane comprises 3-aminopropyltrimethoxysilane or comprises 3-aminopropyltriethoxysilane.

9. A shaped polymer article as defined in claim 1, wherein the article comprises a tubular member that angles in multiple directions, the tubular member having a wall thickness of from about 2 mm to about 6 mm.

10. A shaped polymer article as defined in claim 1, wherein the branched polyphenylene sulfide is polymerized with a dihalo-aromatic compound and a polyhalo-aromatic compound.

11. A shaped polymer article as defined in claim 1, wherein the linear polyphenylene sulfide is present in the composition in an amount from about 55% to about 85% by weight and the branched polyphenylene sulfide is present in the composition in an amount from about 0.5% to about 20% by weight.

12. A process for producing a shaped polymer article comprising:
heating and extruding a fiber reinforced polymeric composition in a downward direction into a hollow parison, the fiber reinforced polymeric composition comprising on a weight basis:
a) a linear polyphenylene sulfide having a melt viscosity of from about 20 Pas to about 500 Pas;
b) a branched polyphenylene sulfide, the weight ratio of the branched polyphenylene sulfide to the linear polyphenylene sulfide being from about 1:5 to about 1:60, the linear polyphenylene sulfide and the branched polyphenylene sulfide being present in the composition in an amount of at least about 35% by weight;
c) reinforcing fibers present in the composition in an amount from about 10% to about 50% by weight;
d) a compatibilizer present in the composition in an amount from about 0.1% to 5% by weight;
e) a polytetrafluoroethylene present in the composition in an amount from about 0.01% to about 3% by weight; and
f) a reactive impact modifier present in the composition in an amount from about 0.5% to about 10% by weight;
wherein the composition has a melt viscosity of at least about 3500 poise measured at 316° C. and at 400 s$^{-1}$, has a low shear rate storage modulus of at least about 1500 Pa measured at 310° C. and at 0.1 rad/s, has a maximum engineering stress of at least about 350 kPa, and has an engineering stress of at least at 350 kPa at a percent strain of about 100%, the parison having a top and a bottom;
clamping the top of the parison and robotically manipulating the parison into a three-dimensional mold cavity;
inflating the parison with sufficient pressure for the parison to conform to the mold cavity; and
removing a shaped polymer article from the mold cavity.

13. A process as defined in claim 12, wherein the article comprises a tubular member that angles in multiple directions, the tubular member having a wall thickness of from about 2 mm to about 6 mm.

14. A process as defined in claim 12, wherein the composition has a melt viscosity of from about 4000 poise to about 12,500 poise measured at 316° C. and at 400 s$^{-1}$, wherein the composition also has a low shear rate storage modulus of from about 1600 Pa to about 6000 Pa measured at 310° C. and at 0.1 rad/s, and wherein the composition has an engineering stress of from about 350 kPa to about 550 kPa at a percent strain of about 100%.

15. A process as defined in claim 12, wherein the branched polyphenylene sulfide is polymerized with a dihalo-aromatic compound and a polyhalo-aromatic compound.

16. A process as defined in claim 12, wherein the linear polyphenylene sulfide is present in the composition in an amount from about 55% to about 85% by weight, and wherein the branched polyphenylene sulfide is present in the composition in an amount from about 0.5% to about 20% by weight.

17. A shaped polymer article as defined in claim 1, wherein the polytetrafluoroethylene is in powder form.

* * * * *